(12) United States Patent
Miyatake et al.

(10) Patent No.: US 6,925,245 B1
(45) Date of Patent: Aug. 2, 2005

(54) METHOD AND MEDIUM FOR RECORDING VIDEO INFORMATION

(75) Inventors: Takefumi Miyatake, Hachioji (JP); Akio Nagasaka, Kodaira (JP); Takehiro Fujita, Mitaka (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/572,627

(22) Filed: May 17, 2000

(30) Foreign Application Priority Data

Jun. 9, 1999 (JP) .......................................... 11-162035

(51) Int. Cl.[7] ............................ H04N 5/91; H04N 17/02
(52) U.S. Cl. ............................. 386/46; 386/69; 348/184
(58) Field of Search .................................. 348/184, 700, 348/154–155; 386/46, 69, 95, 117, 68, 96, 4; 725/61; 369/30; 358/906, 909.1; 345/723, 719

(56) References Cited

U.S. PATENT DOCUMENTS

| | | | | |
|---|---|---|---|---|
| 4,698,664 A | * | 10/1987 | Nichols et al. | 348/184 |
| 5,613,032 A | * | 3/1997 | Cruz et al. | 386/69 |
| 5,848,216 A | * | 12/1998 | Kaneshige | 386/46 |
| 5,995,705 A | * | 11/1999 | Lang | 386/46 |
| 6,157,771 A | * | 12/2000 | Brewer et al. | 386/69 |
| 6,504,990 B1 | * | 1/2003 | Abecassis | 386/46 |
| 6,546,185 B1 | * | 4/2003 | Kim et al. | 386/46 |
| 6,567,980 B1 | * | 5/2003 | Jain et al. | 725/61 |
| 6,625,383 B1 | * | 9/2003 | Wakimoto et al. | 386/46 |
| 6,704,029 B1 | * | 3/2004 | Ikeda et al. | 715/723 |

FOREIGN PATENT DOCUMENTS

| | | |
|---|---|---|
| JP | 4111181 | 4/1992 |
| JP | 06253255 | 9/1994 |
| JP | 08227462 | 9/1996 |
| JP | 09233422 | 9/1997 |

OTHER PUBLICATIONS

Tonomura et al, "Conent Oriented Visual Interface USing Video Icons for Visual Databas Systems", Jan. 22, 1991, Harcourt Brace Jovanovich Publishers, pp. 183–198.*

Tonomura, Yoshinobu and Abe, Shinji; "Content Oriented Visual Interface Using Video Icons for Visual Datebase Systems"; Jan. 15, 1990; Journal of Visual Languages and Computing Academic Press, pp. 183–198.*

* cited by examiner

*Primary Examiner*—Thai Tran
*Assistant Examiner*—Jamie Vent
(74) *Attorney, Agent, or Firm*—Antonelli, Terry, Stout & Kraus, LLP (57) ABSTRACT

A method and a medium for recording video information make it possible to retrieve particular scenes quickly based on representative images alone, which are chosen by taking the contents of images and sounds into account. The method for recording video information comprises a first step of storing video, a second step of dividing the video into segments, and extracting the top frame number of each segment, a third step of extracting the frame number of the frame having the maximum feature amount in each segment, and a fourth step of storing the frame numbers extracted by the second and third step in the first step.

19 Claims, 7 Drawing Sheets

METHOD AND MEDIUM FOR RECORDING VIDEO INFORMATION

BACKGROUND OF THE INVENTION

The present invention relates to the retrieval of video information and provides a method and a medium for recording video information that make it possible to retrieve video information quickly.

With the ever-increasing processing speed and capacity of computers, database systems and presentation tools capable of handling video information such as is recorded on movie films, videotapes, etc. have lately attracted considerable attention. However, it requires a lot of time and labor on the part of a user to retrieve desired pieces of information individually from a huge amount of video information and process the retrieved pieces of information. Accordingly, techniques to aid users in such retrieval and processing by using computers have been made available. For example, a technique, "Method of automatically compiling indexes and method of searching objects in color video images," has been reported in the Transactions of Information Processing Society of Japan, Vol. 33, No. 4; and, another technique, "Method of detecting change points in video," has been disclosed in Japanese Patent Laid-Open No. 4-111181. In accordance with these techniques, video is automatically divided into scenes, and a table of the first images of the scenes is prepared and stored. By using the table as if it were the index of a book, the retrieval and the editing of the video can be facilitated. According to these techniques, because the user can grasp the contents of video in a table at a glance, any scenes searched for can easily be found. In addition, because video is handled scene by scene, the video can easily be edited roughly, or scene-wise.

SUMMARY OF THE INVENTION

In accordance with the above techniques, however, the first, or the last, or the middle image is merely chosen from each scene on a fixed-timing basis to have the chosen image represent the scene. In other words, the importance of each image in a scene is not taken into account in choosing a representative image. In the video of a piece of news, for example, images captured by using a flashbulb or images on which subtitles are superimposed would be important. In the video of a sportscast, images captured when a great cheer arose would be important. Furthermore, images containing a close-up of a particular person or images wherein a large number of people appear can be important. In conventional methods of choosing representative images, however, the contents of images or sounds are not taken into account in choosing representative images. Therefore, when the user searches for a particular scene in a table of representative images, the scene often cannot be found because the information provided by the representative images alone is not sufficient. The user usually has to replay scenes as motion picture images to find the particular scene, which consumes a considerable time.

The object of the present invention is to provide a method and a medium for recording video information that make it possible to retrieve particular scenes quickly based on representative images alone, which are chosen by taking the contents of images and sounds into account.

To solve the above problem, the method of recording video information in accordance with the present invention comprises a first step of storing video on a medium, a second step of dividing the video into segments and extracting the top frame number of each segment, a third step of extracting the frame number of the frame image having the maximum feature amount in each video segment, and a step of storing the frame numbers extracted in the second and third steps on the medium.

In the second step, video is divided into segments each containing one and the same number of frames, or the division of video takes place each time the scene changes in the video.

The feature amount of each frame image in the third step is calculated from the video data or the audio data of the frame image. The feature amount calculated from the video data of each frame image is the sum of brightness of the pixels of the frame image, or the sum of the pixels having a specific color in the frame image, or the sum of differences in brightness between adjoining pixels in the frame image. The feature amount calculated from the audio data of each frame image is the sum of absolute values of the audio data corresponding to each frame.

The medium in the first step is a random-access medium, such as a magnetic disk, a compact disk, a digital video disc, or a flash memory.

These and other objects, features and advantages of the present invention will become more apparent in view of the following detailed description of the preferred embodiments in conjunction with accompanying drawings.

DESCRIPTION OF THE PREFERRED EMBODIMENTS

An embodiment of the present invention will be described in detail below.

Figure 1:
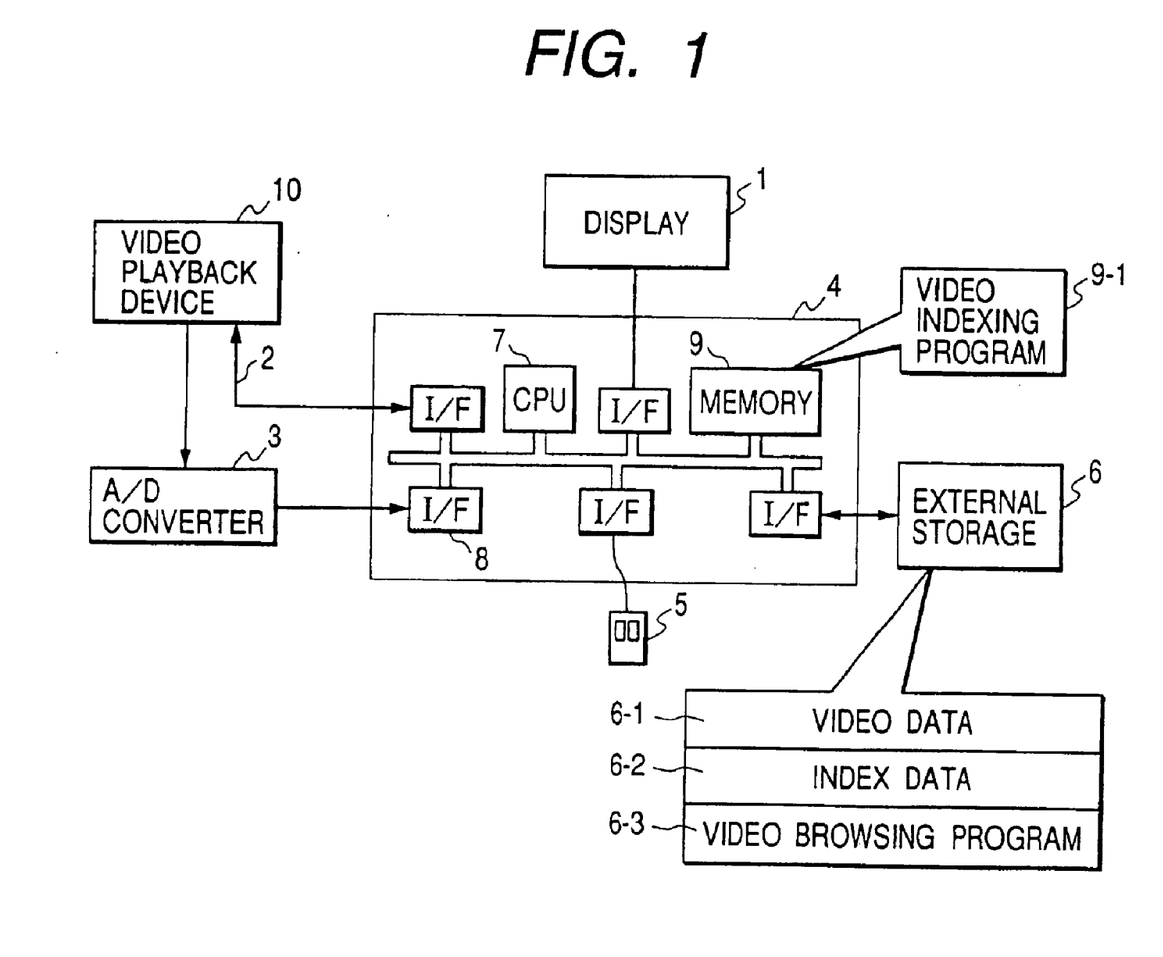
FIG. 1 is a system block diagram of a system for storing and retrieving video information according to the present invention.

FIG. 1 is a schematic block diagram of a system in which the present invention is embodied. The reference numeral 1 denotes a display unit such as a CRT, which displays the output images generated by a computer 4. Instructions can be given to the computer 4 by using an input device 5, such as a keyboard or a pointing device. A video playback device 10 is an optical-disk drive, a VCR (video cassette recorder), or the like. The video signals output from the video playback device 10 are sequentially converted by an A/D converter 3 into digital video data and sent to the computer. In the computer, the digital video data enters through an interface 8 and is stored into a memory 9 to be processed by a CPU 7 in accordance with a video indexing program 9-1 stored in the memory 9. In the case when each of the frames of video handled by the video playback device 10 is assigned a number (a frame number) in the order of the top frame down to the bottom one, the video of a scene can be replayed by sending the corresponding frame numbers through a control line 2 to the video playback device. Various information necessary for processing can be stored in an external storage 6, including video data 6-1, index data 6-2 such as the frame numbers of representative images, and a video browsing program 6-3.

According to the present embodiment, in the system including the video-storing device described above, video from the video playback device 10 is input frame by frame into the memory 9 in accordance with the video indexing program 9-1. The input video is displayed on the display 1.

Besides, the feature amounts of the frame images in the video are calculated and displayed, together with the video, on the display 1. As the video advances from scene to scene, the frame of the maximum feature amount in each scene is treated as the representative image of the scene. Icons of representative images are created, and a table of icons is displayed on the display 1. Information on the change of scenes and information on the representative images obtained during the above processing are, together with the video, stored in the external storage 6.

Moreover, the video browsing program 6-3 is stored in the external storage 6. Accordingly, even if the external storage 6 containing the video and the index information is disconnected from the computer 4 and connected to another computer, the video can be browsed without installing a browsing program in the computer. An editing program as well as the video browsing program may be stored in the external storage 6 as the occasion demands, which increases the utility of the system.

Although video is input from a video playback device such as a VTR, a DVD drive, or the like in the present embodiment, video of a telecast from a tuner, video from a video camera, or video stored in an external storage such as a HDD may be input.

In the case in which video data is of ten carried from place to place, an external storage capable of reading and writing a removable medium, such as an optical disk (compact disk), a digital video disc, or a flash memory, may be used.

Figure 2:
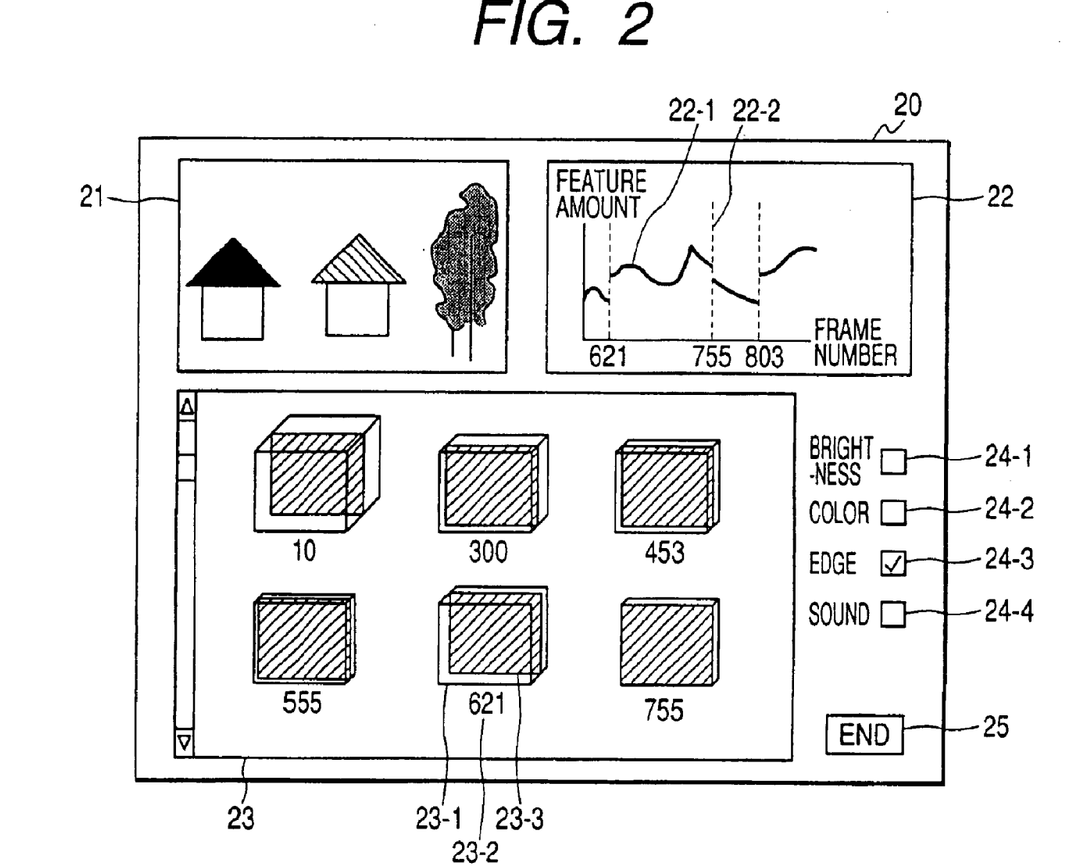
FIG. 2 is a diagram of on the display device of FIG. 1.

FIG. 2 shows a picture produced on the display unit of FIG. 1. The window 20 includes a number of video windows displayed by the video indexing program 9-1, including a video window 21, a feature amount window 22; a representative image window 23. Check buttons 24-1, 24-2, 24-3, and 24-4 are used to choose one among the various kinds of features, of which the amounts are extracted from frame images. If the check button 24-1 is selected, the video indexing program 9-1 extracts the brightness of each frame image as its feature amount.

In the same way, if the check button 24-2, 24-3, or 24-4 is selected, the color, the edge, or the sound, as the case may be, is extracted as the feature amount. Two or more buttons can be chosen simultaneously. Extracted feature amounts are displayed frame by frame as a graph 22-1 in the window 22. The feature amount of each frame image of each video segment is calculated, and the frame image of the maximum feature amount is treated as the representative image of said video segment.

Each video segment is indicated in image window 23 by a rectangular parallelepiped 23-1 and the first frame number 23-2 of said video segment. The depth of the rectangular parallelepiped 23-1 represents the number of frames of said video segment, and the extracted representative image 23-3 is reduced in size and disposed at the depth corresponding to its frame number in the rectangular parallelepiped. Video is divided into segments by detecting a change of the scene or is so divided into segments that every segment contains the same number of frames.

The table of representative images so extracted is suitable for a user to browse the video from the viewpoint of his or her interest. Images of newscasts captured by using flashbulbs would be entered in the table of representative images of maximum brightness, on which the user can easily find important scenes. Close-ups of persons would be entered in the table of representative images of maximum flesh-color amounts. Images with subtitles would be entered in the table of representative images of maximum edge amounts, and the user, by using the table, can quickly browse programs wherein subtitles are used. By using the table of representative images of maximum sound amounts, the user can easily find highlight scenes of sport programs in which great cheers arose.

Figure 3:
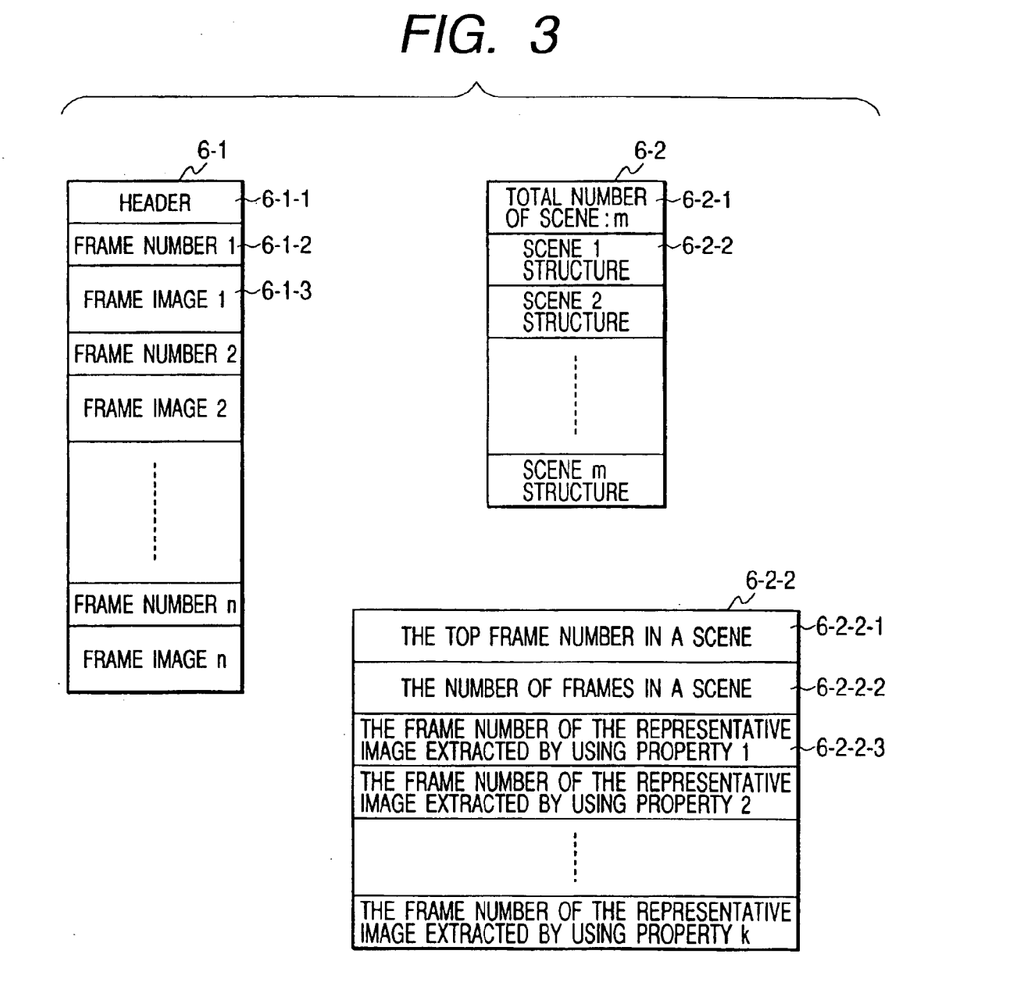
FIG. 3 is a diagram which shows the structure of data stored in the external storage of FIG. 1.

FIG. 3 shows a data structure of video data 6-1 and the index data 6-2 stored in the external storage 6. The video data 6-1 is stored in the form of a number of frame images 6-1-3 and the same number of frame numbers 6-1-2 following a header 6-1-1 wherein the video size, the compression format, etc. are described. The index data 6-2 comprise the total number of scenes 6-2-1 representing the number of video segments and scene structures 6-2-2 describing the contents of each scene. Each scene structure 6-2-2 comprises the top frame number 6-2-2-1 of the scene, and the number of frames 6-2-2-2 of the scene, the frame numbers of the representative images 6-2-2-3 corresponding to a plurality of features. According to the present invention, because the video data 6-1 and the index data 6-2 are linked to each other by the frame numbers, the user can replay pieces of video at random, referring to the index data. The time code, instead of the frame number, may be used to attain the same effect.

Figure 4:
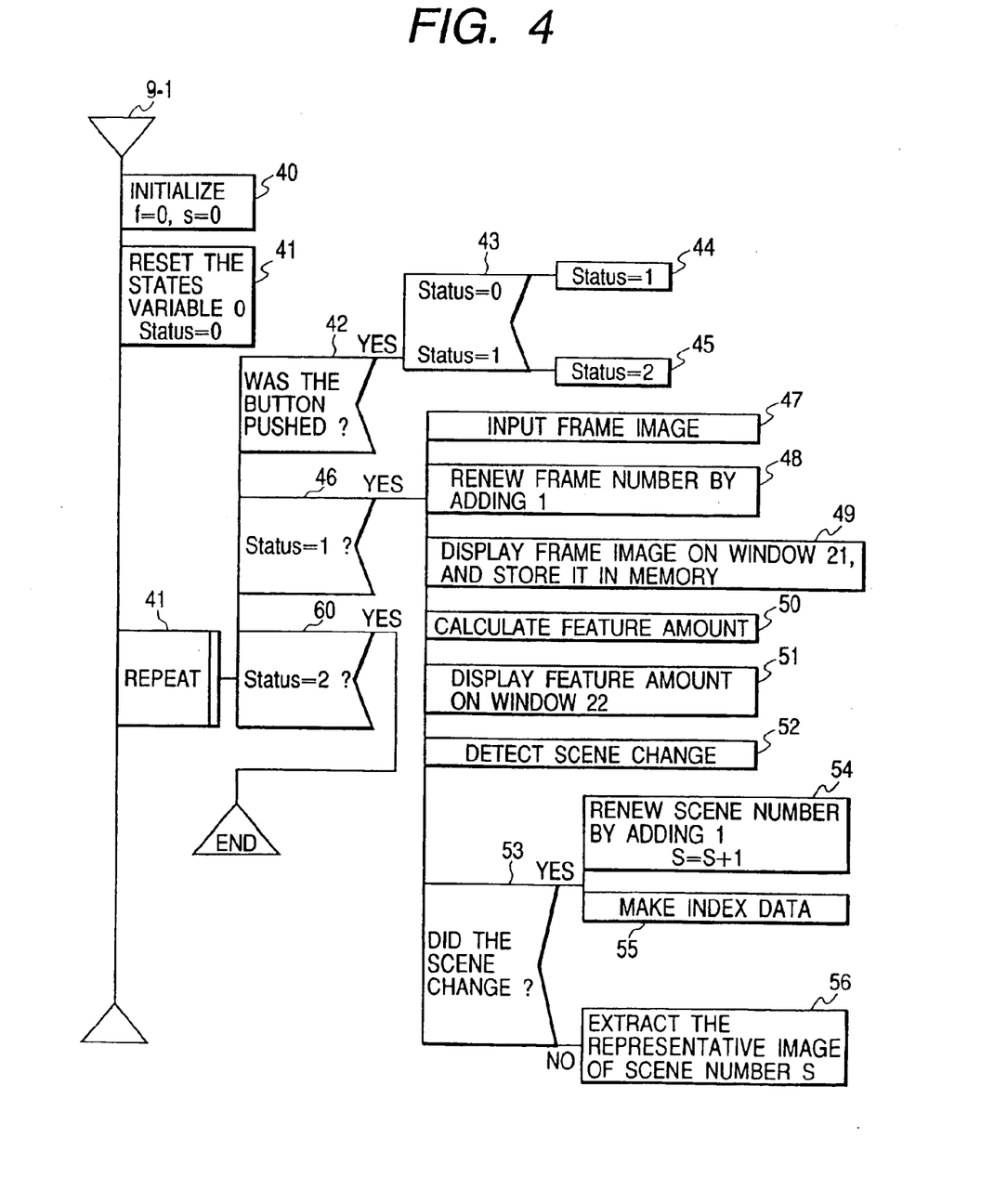
FIG. 4 is a flowchart of the video indexing program of FIG. 1.

FIG. 4 shows a flowchart of the video indexing program 9-1 that runs on the system of FIG. 1. In accordance with the video indexing program 9-1 which is stored in the memory 9, the CPU 7 executes a process operation 40, in the first place, to initialize the windows 21, 22, and 23 of FIG. 2, and, at the same time, resets the frame number "f" and the scene number S to "O's". Then, in process operation 41, the CPU 7 resets to "O" the status variable, "Status," which controls the status of indexing. And, the CPU 7 executes the following process repeatedly until Status becomes "2".

First, in process operation 42, it is checked whether the button 25 has been pushed or not. In the case when the button 25 has been pushed in process operation 43, it is checked whether Status is "O" or not. If Status is "O", the status is advanced to "1" in process operation 44 to render the system ready for indexing. If the Status is "1", it is advanced to "2" in process operation 45 to end the indexing.

Then, in process operation 46, it is checked whether Status is "1" or not. In the case when Status is "1", the following indexing process is executed.

First, in process operation 47, a frame image constituting video is input from the video playback device 10 and stored into the memory 9. The audio data attached to the frame, if necessary, is also stored in the memory 9. Then, in process operation 48, the frame number "f" is renewed by doing one to it. If the frame number can be read out from the video playback device 10, the frame number so read out may be substituted for the variable "f" Then, in process operation 49, the input frame image is displayed in the window 21 and, at the same time, is stored as video data 6-1 in the external storage 6.

Then, in process operation 50, the feature amounts are calculated from frame images or audio data to choose a representative image. The details of this process will be described later with reference to FIG. 5. In process operation 51, the graph of the feature amounts calculated in the process operation 50 is displayed in the window 22.

Lastly, the process of dividing video into video segments is executed. First, in process operation 52, the change of a scene is detected. The correlation between the current frame image and previous ones is determined from the differences in their color histogram, and the point in time when the correlation has been interrupted is regarded as the change of the scene. The technique disclosed in Japanese Patent Laid-Open No. 8-227462, "Method and device for detecting change points of video," of the inventors, for example, can be used to execute the process operation 52. Then, in process operation 53, it is determined whether the scene has changed or not. In the case when the scene has changed, process operations 54 and 55 are executed. In the process operation 54 the scene number S is renewed by adding one to it. Then, in the process operation 55, index data is prepared and displayed in the window 23, and, at the same time, it is stored as index data 6-2 in the external storage 6. This process will be described in detail later with reference to FIG. 6. In the case when the scene has not changed, the representative image of the scene number S is extracted in process operation 56. The details of this process will be described later with reference to FIG. 7.

After the above process of indexing, it is checked in process operation 60 to determine whether Status is "2" or not. If it is "2", the indexing is ended.

Figure 5:
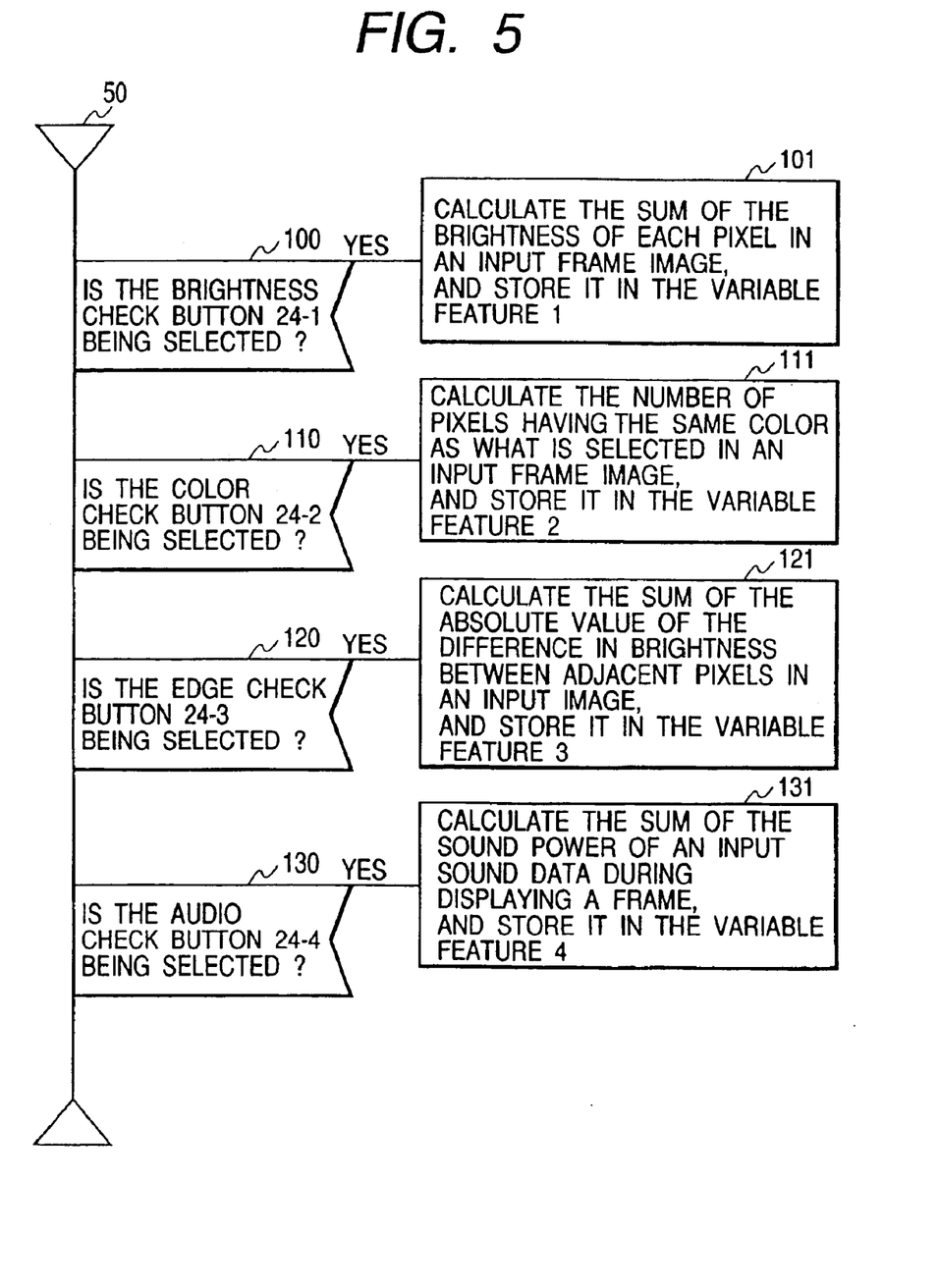
FIG. 5 is a flowchart showing the details of the process of calculating feature amounts.

FIG. 5 shows the details of the process of calculating feature amounts according to the present invention. First, in process operation 100, it is checked to determine whether the brightness check button 24-1 has been selected or not. In the case when this button is chosen, process operation 01 is executed. In the process operation 101, the sum of the brightness of the individual pixels of each frame image of each scene is calculated and stored in a variable, "Feature I".

Then, in process operation 110, it is checked to determine whether the color check button 24-2 has been selected or not. In the case where it is selected, process operation 111 is executed. In the process operation 111, the number of pixels of the color designated in advance of each input frame image is calculated and stored in a variable, "Feature 2".

Similarly, in process operation 120, it is checked to determine whether the edge check button 24-3 has been selected or not. In the case where it is selected, process operation 121 is executed. In the process operation 121, the sum of absolute values of differences in brightness between adjacent pixels of each input frame image is calculated and stored in a variable, "Feature 3".

Lastly, in process operation 130, it is checked to determine whether the sound check button 244 has been selected or not. In the case where it is selected, process operation 131 is executed. In the process operation 131, the sum of sound intensities of the audio data corresponding to the frame span of each input frame image is calculated and stored in a variable, "Feature 4".

Although the above feature amounts are the number of specific pixels or the simple sum of a variable for each input frame image or for each frame span, they may be normalized by the number of pixels in the frame or by the frame span as the case may be.

Figure 6:
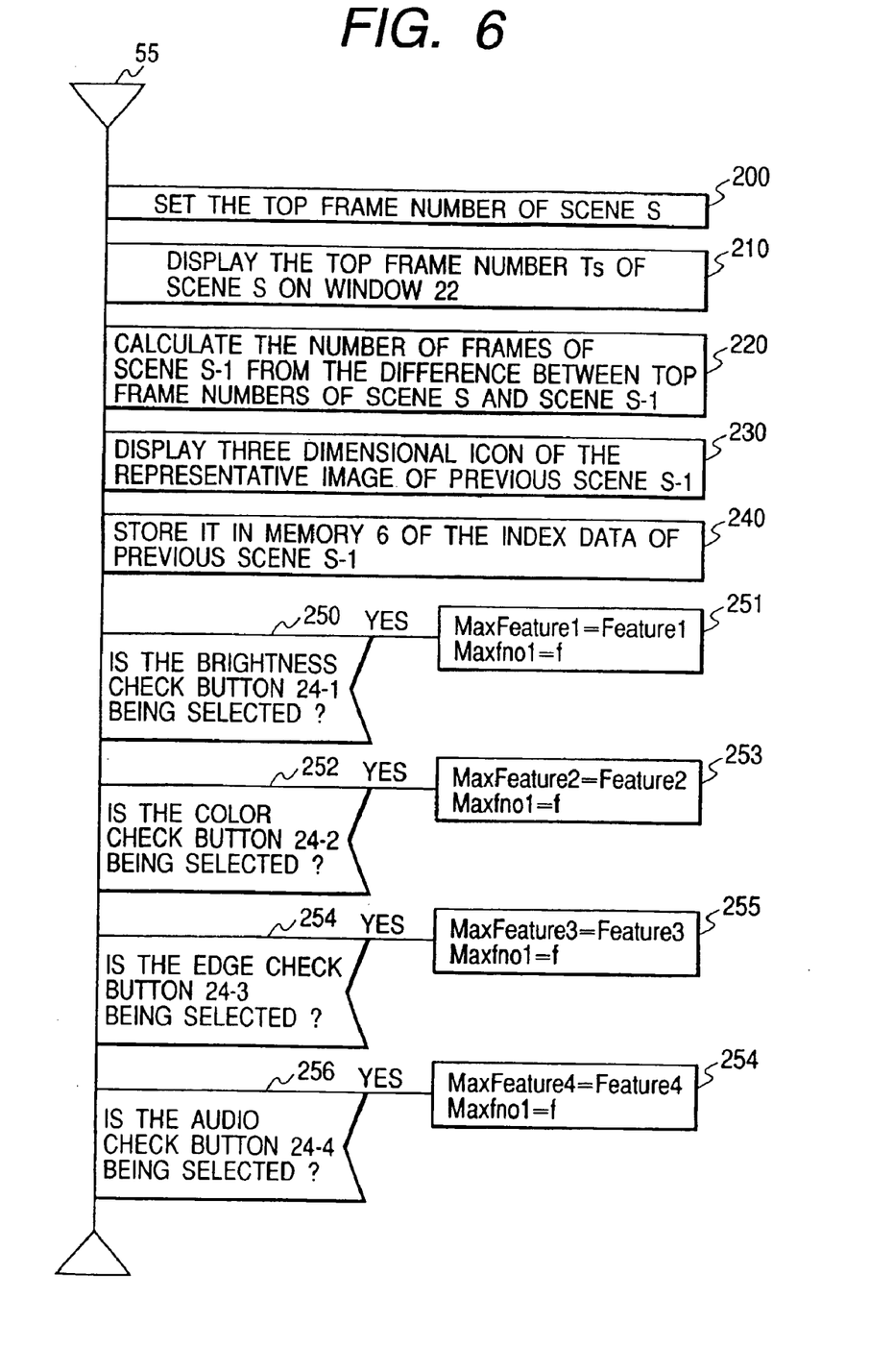
FIG. 6 is a flowchart showing the details of the process of preparing index data.

FIG. 6 shows the details of the process of preparing index data.

In process operation 200, the current frame number "f" is treated as the top frame number Ts of a new scene S. In process operation 210, the top frame number Ts of the scene S is displayed in the window 22.

Then, in process operation 220, the number of frames of the preceding scene S-1 is calculated from the difference between the top frame number of the preceding scene S-I and that of the scene S. In process operation 230, the representative image, or the frame image of the maximum feature amount, of the preceding scene S-1 is disposed at an appropriate depth in the rectangular parallelepiped and displayed in the window 23. Then, in process operation 230, the index data of the previous scene S-1 is stored in the external storage 6.

Lastly, the process of initialization is executed to find the representative image of the new scene S.

First, in process operation 250, it is checked to determine whether the brightness check button has been selected or not. In the case where it is selected, process operation 251 is executed. In the process operation 251, the variable, "Feature 1," is substituted for the variable, "Max Feature 1," and the current frame number "f" is substituted for the variable, "Maxfno 1." Max Feature 1 is a variable to hold the maximum value of the feature amounts, and Maxfno 1 is a variable to hold the number of the frame of the maximum feature amount.

Next, in process operation 252, it is checked to determine whether the color check button 24-2 has been selected or not. In the case where it is selected, process operation 253 is executed in the process operation 253, the variable, "Feature 2" is substituted for the variable, "Max Feature 2", and the current frame number "f" is substituted for the variable, "Maxfno 2.

Similarly, in process operation 254, it is checked to determine whether the edge check button 24-3 has been selected or not. In the case where it is selected, process operation 255 is executed. In the process operation 255, the variable, "Feature 3" is substituted for the variable, "Max Feature 3", and the current frame number "f" is substituted for the variable, "Maxfno 3".

Lastly, in process operation 256, it is checked to determine whether the sound check button 244 has been selected or not. In the case where it is selected, process operation 257 is executed. In the process operation 257, the variable, "Feature 4" is substituted for the variable, "Max Feature 4", and the current frame number "f" is substituted for the variable, "Maxfno 4".

Thus, the process of initialization to find the representative image is ended. A process operation to be performed after this serves to update the maximum value of the feature amount on every entry of a frame image. This process will be described with reference to FIG. 7.

Figure 7:
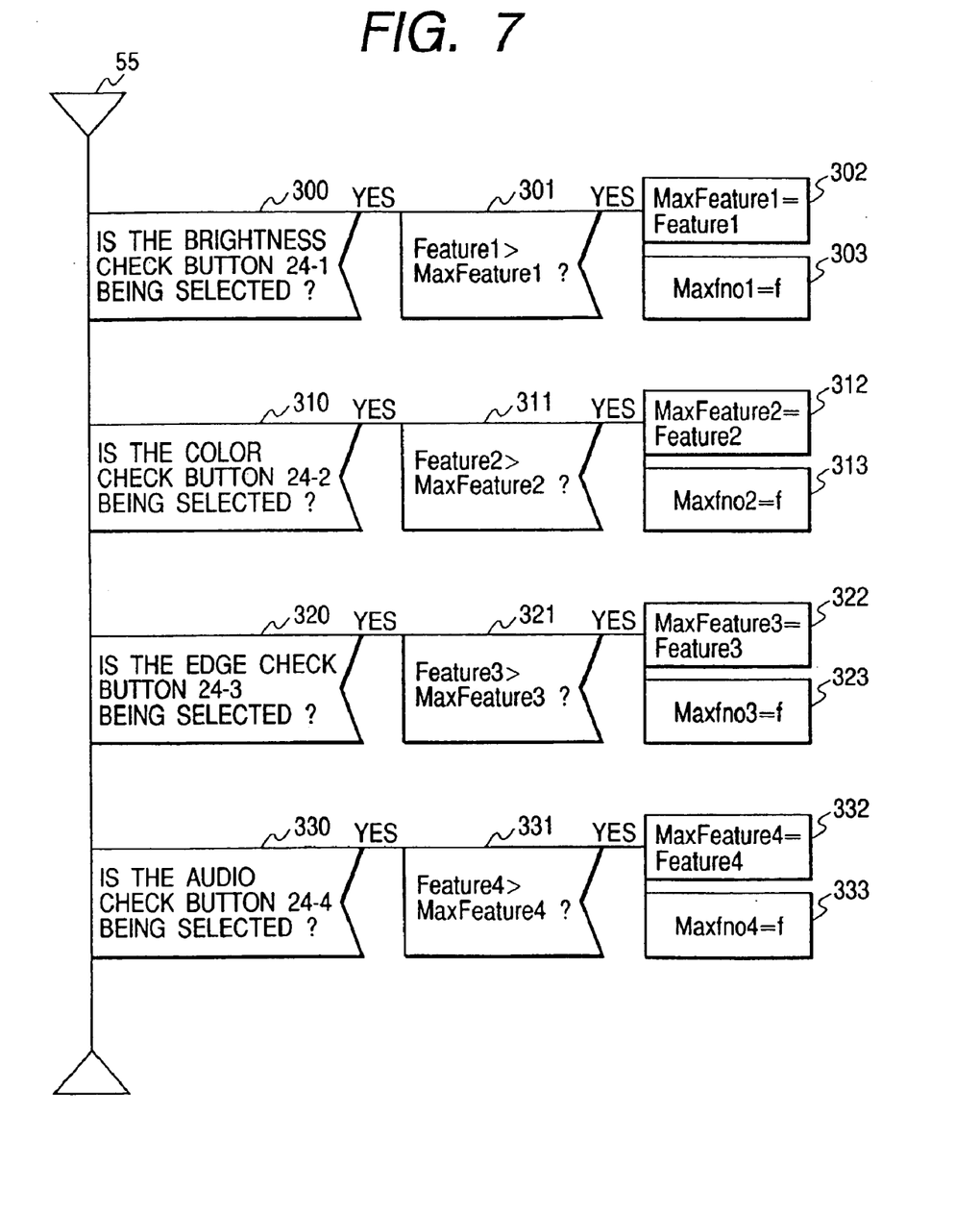
FIG. 7 is a flowchart showing the details of the process of extracting representative images.

FIG. 7 shows the details of the process of extracting representative images according to the present invention.

First, in process operation 300, it is checked to determine whether the brightness check button 24-1 has been selected or not. In the case where it is selected, process operation 301 is executed.

In the process operation 301, it is determined whether the variable, "Feature I" is greater than the variable, "Max Feature 1" or not. In the case where it is greater, the maximum value is updated in process operation 302. Namely, the variable, "Feature 1" is substituted for "Max Feature 1". Then, in process operation 303, the frame number of the representative image is also updated. Namely, the frame number "f" is substituted for the variable, "Maxfno 1".

Next, in process operation 310, it is checked to determine whether the color check button 24-2 has been selected or not. In the case when it is selected, process operation 311 is executed. In process operation 311, it is checked to determine whether the variable, "Feature 2" is greater than the variable, "Max Feature 2". In the case where it is greater, the maximum value is updated in process operation 312. Namely, the variable, "Feature 2" is substituted for "Max Feature 2". Then, in process operation 313, the frame number of the representative image is also updated. Namely, the frame number "f" is substituted for the variable, "Maxfno 2".

Similarly, in process operation 320, it is checked to determine whether the edge check button 24-3 has been selected or not. In the case where it is selected, process operation 321 is executed. In the process operation 321, it is determined whether the variable, "Feature 3" is greater than the variable, "Max Feature 3" or not. In the case where it is greater, the maximum value is updated in process operation 322. Namely, the variable, "Feature 3" is substituted for "Max Feature 3". Then, in process operation 323, the frame number of the representative image is also updated. Namely, the frame number "f" is substituted for the variable, "Maxfno 3".

Lastly, in process operation 330, it is checked to determine whether the sound check button 244 has been selected or not. In the case where it is selected, process operation 331 is executed. In the process operation 331, it is determined whether the variable, "Feature 4" is greater than the variable, "Max Feature 4". In the case where it is greater, the maximum value is updated in process operation 332. Namely, the variable, "Feature 4" is substituted for "Max Feature 4". Then, in process operation 333, the frame number of the representative image is also updated. Namely, the frame number "f" is substituted for the variable, "Maxfno 4".

According to the present invention, the entire video is divided into video segments, and the feature amounts are determined by contents of images and audio data of the video segments. Since index data is created using one or a plurality of representative images for each feature amount, it is possible to browse the video quickly in accordance with the viewpoint of a user.

Further, according to the present invention, since video data and index data are stored in the same medium, operability is not disturbed even when such data is carried and browsed by some other devices. Still further, a video browsing program as well as the video data and the index data may be stored in the same medium, which eliminates the inconvenience of installing the video browsing program on another device by which the former data can be browsed.

Also, according to the present invention, frame numbers are extracted and stored instead of frame images. Therefore, information corresponding to representative images can be stored using a memory with very little capacity.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A method of storing video information comprising steps of:
   storing video on a recording medium;
   dividing the video into segments and extracting at least one of a top frame number and a top frame time code of each segment;
   calculating an amount of at least one predetermined feature of each frame image of each segment from frame data of each frame image;
   extracting at least one of a frame number and a time code of a frame image having a maximum feature amount of the at least one predetermined feature in each video segment; and
   storing at least one of the frame number and the time code of the top frame and of the frame having the maximum feature amount of the at least one predetermined feature the recording medium.

2. A method of storing video information according to claim 1, wherein each of the segments contains the same number of frames.

3. A method of storing video information according to claim 1, wherein the video is divided into the segments each time the scene changes in the video.

4. A method of storing video information according to claim 1, wherein the amount of the at least one predetermined feature is an amount of an audio feature which is calculated from audio data.

5. A method of storing video information according to claim 1, wherein the amount of the at least one predetermined feature amount which is calculated from each frame image a sum of brightness of pixels of the frame image.

6. A method of storing video information according to claim 1, wherein the amount of the at least one predetermined feature which is calculated from said each frame image is sum of pixels having a specified color in the frame image.

7. A method of storing video information according to claim 1, wherein the amount of the at least one predetermined feature which is calculated from each frame image is a sum of differences in brightness between adjoining pixels in the frame image.

8. A method of storing video information according to claim 4, wherein the amount of the at least one predetermined feature which is calculated from the audio data is a sum of absolute values of the audio data corresponding to each frame image.

9. A method of storing video information according to claim 1, wherein the recording medium which stores the video is a magnetic disk.

10. A method of storing video information according to claim 1, wherein the recording medium which stores the video is an optical disk.

11. A method of storing video information according to claim 1, wherein the recording medium which stores the video is a digital video disc.

12. A method of storing video information according to claim 1, wherein the recording medium which stores the video is a flash memory.

13. A method of storing video information according to claim 1, wherein a program for browsing video information is further stored on the recording medium.

14. A method of storing video information according to claim 1, further comprising a step of receiving an input of a selection of the at least one predetermined feature.

15. A method of storing video information according to claim 14, further comprising a step of displaying a plurality of predetermined features before the selection of the at least one predetermined feature is inputted.

16. A method of storing video information according to claim 13, further comprising a step of displaying figures representing each segment with the extracted frames having the maximum feature amount of the at least one predetermined feature.

17. A method of storing video information according to claim 1, wherein time codes of top frames of each segment and of frame images having the maximum feature amount in each segment are extracted.

18. A method of storing video information according to claim 1, wherein frame number of top frames of each segment and of frame images having the maximum feature amount in each segment are extracted.

19. A recording medium on which a method of storing video information is recorded, said method comprising steps of:

storing video on a recording medium;

calculating an amount of at least one predetermined feature of each frame image from frame data of each frame image;

dividing the video into segments and extracting the top frame number of each segment;

extracting a frame number of a frame image having a maximum feature amount of the at least one predetermined feature in each video segment; and storing the frame numbers of the top frame and of the frame having the maximum feature amount of the at least one predetermined feature on the recording medium.

* * * * *